United States Patent [19]
Levac et al.

[11] Patent Number: 5,872,926
[45] Date of Patent: Feb. 16, 1999

[54] INTEGRATED MESSAGE SYSTEM

[75] Inventors: Ronald A. Levac, Hartland; Stephen D. Bilgrien, Iron Ridge; Michael J. Peters; Robert K. Kuecherer, both of Menomonee Falls, all of Wis.

[73] Assignee: Adaptive Micro Systems, Inc., Milwaukee, Wis.

[21] Appl. No.: 656,377

[22] Filed: May 31, 1996

[51] Int. Cl.[6] ............................................. H04M 11/00
[52] U.S. Cl. ......................... 395/200.36; 340/825.44; 379/93.15; 379/93.24; 379/100.08; 379/100.13; 455/417
[58] Field of Search ................... 395/200.36, 200.68, 395/200.73, 200.75; 379/93.01, 93.15, 93.24, 100.01, 100.03, 100.13; 340/825.44; 455/412, 417

[56] References Cited

U.S. PATENT DOCUMENTS

| | | | |
|---|---|---|---|
| 4,837,798 | 6/1989 | Cohen et al. | 379/88 |
| 4,910,765 | 3/1990 | Matsuse et al. | 379/100.13 |
| 5,138,653 | 8/1992 | Le Clercq | 379/93.24 |
| 5,146,488 | 9/1992 | Okada et al. | 379/88 |
| 5,177,680 | 1/1993 | Tsukino et al. | 395/751 |
| 5,333,266 | 7/1994 | Boaz et al. | 395/200.36 |
| 5,381,527 | 1/1995 | Inniss et al. | 395/200.69 |
| 5,406,557 | 4/1995 | Baudoin | 370/407 |
| 5,428,663 | 6/1995 | Grimes et al. | 340/825.44 |
| 5,459,775 | 10/1995 | Isono et al. | 379/93.15 |
| 5,479,408 | 12/1995 | Will | 340/825.44 |
| 5,479,411 | 12/1995 | Klein | 379/88 |
| 5,487,100 | 1/1996 | Kane | 340/825.44 |
| 5,495,234 | 2/1996 | Capp et al. | 340/825.44 |
| 5,509,000 | 4/1996 | Oberlander | 370/409 |
| 5,513,126 | 4/1996 | Harkins et al. | 395/200.36 |
| 5,524,137 | 6/1996 | Rhee | 379/100.08 |
| 5,608,786 | 3/1997 | Gordon | 379/100.08 |
| 5,627,997 | 5/1997 | Pearson et al. | 395/200.36 |

OTHER PUBLICATIONS http://cognisoft.com; Information retrieved from Internet Web site on Sep. 25, 1996 and Sep. 26, 1996.

http://www.globalvillage.com; Information retrieved from Internet Web site on Dec. 10, 1996. (Press Release Dated Mar. 18, 1996).

1996 Global Village Communication; FocalPoint data sheets. (No Date).

http://www.frontec.com; Information retrieved from Internet Web site on Dec. 11, 1996. (Press Release Dated Apr. 29, 1996).

1996 Frontec AMT, Inc., Intelligent Messaging Solutions: It's About Time, pp. 1–10.

1996 Frontec AMT, Inc., The AMTrix System Product Overview, pp. 1–8.

Frontec, The AMTrix System Product Description, Sep. 1, 1996.

Messaging: The Intelligent Way, from Business Systems Magazine, dated Aug. 1996.

*Primary Examiner*—Eric W. Stamber
*Attorney, Agent, or Firm*—Foley & Lardner

[57] ABSTRACT

A system and method for transmitting a message generated by a message source to diverse communication devices. The types of communication devices to receive the message and their respective sites are selected in response to message parameters contained in the message file. The message is converted to a format appropriate for communicating with selected communication devices and then automatically transmitted to the selected sites.

22 Claims, 5 Drawing Sheets

INTEGRATED MESSAGE SYSTEM

BACKGROUND OF THE INVENTION

The present invention relates generally to communication systems. More particularly, the invention relates to a system in which messages generated by a message source are automatically converted to the proper mediums for transmission to various types of communication devices used by selected recipients.

In today's world, many different modes of communication have become commonplace. By way of example, people often communicate via e-mail, voice mail or facsimile. In addition, people may employ many different data services to handle their electronic or voice mail. Although a great technological advance, the availability of these various modes of communication has spawned inefficiency since sending messages to or receiving messages from diverse sources has grown increasingly complex.

Known prior art systems have attempted to address this inefficiency. For example, one system discloses a unified messaging system in which a user has unified access to any messaging service. All messages to a specified user, regardless the source, are automatically routed to a user-designated messaging mailbox. The mailbox notifies the user that a new message has been received. In the event the message could not be forwarded to the mailbox, the notification relays the information that the message is waiting on another service. Although, the unified messaging system addresses the problem of receiving messages from diverse sources, it does not offer a solution for efficiently sending communications to diverse sources.

In today's workplace, efficient communication with many different individuals or groups of people has become paramount. Unfortunately, as not everyone communicates via the same type of communication device, a single message intended for many different recipients often cannot be sent using a single mode of communication. For example, a manager at a facility employing both office workers and assembly line workers might want to distribute a company-wide message. The manager can communicate with the office workers via e-mail, but can reach the assembly line workers only by posting the message on a bulletin board or displaying the message on a message marquee. Thus, to communicate with all the intended recipients, the message originator is forced to generate the same message repeated times using various modes of communication.

It would therefore be advantageous to provide a communication system that transmits a message generated by a message source to a variety of recipients communicating via diverse communication devices. The system would automatically convert the message to the appropriate communication format and transmit the message to the selected recipients at their respective sites. In addition, the system would include an open architecture that advantageously could receive message from diverse sources, whether originated by users using a variety of user interfaces or originated by automated sources, such as other software applications or hardware devices.

SUMMARY OF THE INVENTION

The present invention provides an innovative system and method for automatically converting a message generated by a variety of message sources to the appropriate format for communication with diverse communication devices selected in response to message parameters included in a message file. The converted message is then automatically transmitted to the selected devices at sites determined by the message parameters.

Thus, in accordance with a first aspect of the invention, an integrated message system includes a plurality of types of communication devices, of which each type communicates in a format different than the other types. The system further includes a message source, a message server and a communication device interface. The message server receives a communication generated by the message source. The communication includes a message portion and a message parameter portion, which includes information specifying a communication destination having at least one of the types of communication devices. The message server automatically dispatches the communication to the communication device interface in response to the message parameter portion. The communication device interface converts the message portion and generates at least one converted message in the format compatible with the at least one type of communication device at the communication destination. The communication device interface further transmits the at least one converted message to the communication destination.

In accordance with a further aspect of the invention, a method is provided for sending a message to at least one of a plurality of types of communication devices, each type of which communicates in a format different than the other types. A communication, which includes a message portion and a message parameter portion, is generated with a message source. The communication is transmitted to a message server, and a recipient type of communication device and a communication destination are selected in response to the message parameter portion. The message portion is converted to a converted message in the format compatible with the recipient type of communication device. The converted message is automatically sent to the recipient type of communication device at the communication destination.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
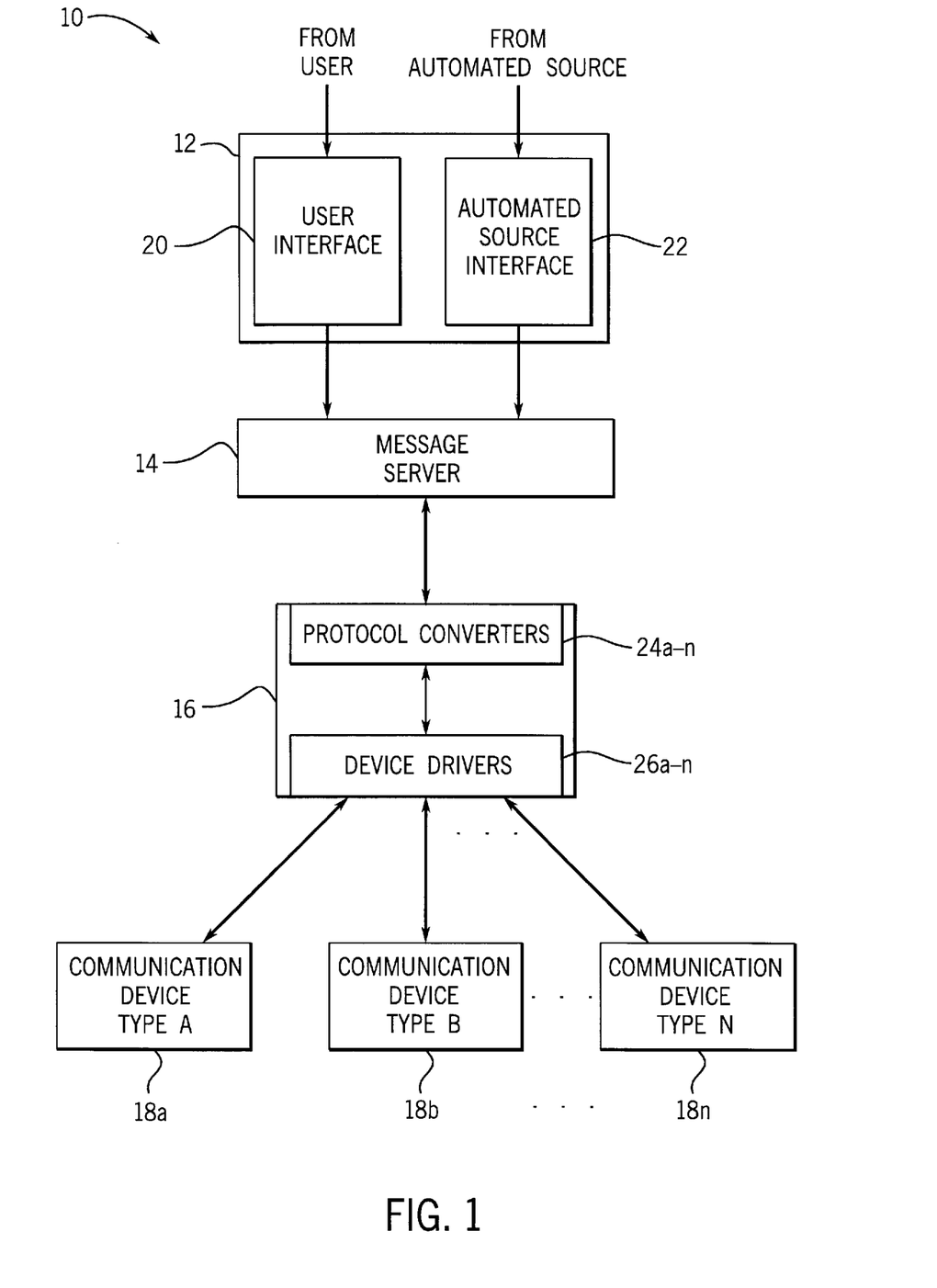
FIG. 1 is a system level block diagram of an exemplary embodiment of an integrated message system illustrating the relationship between various levels of the system.

Turning now to the figures, and referring specifically to FIG. 1, a system level diagram of an integrated message system 10 is illustrated. System 10 offers an open architecture compatible with a wide variety of message sources and recipient communication devices. Accordingly, a message generated by a source, such as a user, a real-time data source, a sensor or other software applications or hardware devices, can be automatically transmitted to diverse communication devices, such as networked personal computers, message marquees, telephone systems, alphanumeric and vibrating pagers, fax machines, audio devices, information kiosks, internet/intranet terminals or bulletin boards. Because of the versatility of system 10, system 10 is particularly suited for use in many applications, such as employee communications, emergency messaging, dispatching, automatic call distribution and real-time production data messaging. Types of messages include text messages, variable data updates, source commands and requests for data or responses from the communication device. Further, system 10 allows different applications to run simultaneously, thus providing an efficient integrated messaging system.

As depicted in FIG. 1, system 10 includes a message interface 12, a message server 14, a communication device interface 16 and a plurality of types of communication devices 18a–n. Message interface 12 preferably includes a user interface 20 and an automated source interface 22. User interface 20 permits a user to generate a message, such as with a text editor or a database, including message parameters providing information about the message, such as the intended recipients. Automated source interface 22 allows messages from automated sources, such as other software programs or hardware devices, to be input into system 10. Messages generated by either user interface 20 or automated source interface 22 are relayed to message server 14 over a Dynamic Data Exchange ("DDE") link or in a message server (".msa") file format. In alternative embodiments, messages can be relayed using different methods, such as a net DDE.

The .msa file format is a standardized file format used to submit communications, regardless the source, to message server 14 and preferably is an Object Linking and Embedding ("OLE") compound file format. The actual message is embedded in the .msa file, which also includes data streams specifying parameters, such as date, time and destination, required to transmit the message to selected communication devices 18a–n. In the preferred embodiment, the OLE file includes data streams providing the following information:

1. OWNER: identifies the user who created the file; required stream.
2. FILENAME: identifies the name the file was saved as by the user; required stream.
3. FILETYPE: identifies the format (for example, .wav or .msw) of the actual message as generated embedded within the .msa file; required stream.
4. DATA: contains the message and associated components, such as text characters or control codes, to be sent to communication devices 18a–n; required stream.
5. DATATYPE: identifies the function of each component of the DATA stream; required stream. For example, the DATATYPE stream identifies whether a component is a control code or a text character.
6. RUNTIME: identifies the period of time the message should run; required stream. The RUNTIME stream includes the following fields:
   a. type: identifies the type of time, such as local time, time zone offsets, or immediate.
   b. priority: indicates the priority of the message. The preferred embodiment includes three priority levels: normal, high and exclusive. High priority messages run alternately with normal priority messages; exclusive message preclude non-exclusive messages from running.
   c. sYear: specifies the year to start running.
   d. sMonth: specifies the month to start running.
   e. sDay: specifies the day to start running.
   f. sHour: specifies the hour to start running.
   g. sMinute: specifies the minute to start running.
   h. sSecond: specifies the second to start running.
   i. eYear: specifies the year to end running.
   j. eMonth: specifies the month to end running.
   k. eDay: specifies the day to end running.
   l. eHour: specifies the hour to end running.
   m. eMinute: specifies the minute to end running.
   n. eSecond: specifies the second to end running.
7. VARSTART: describes the variable conditions that must be satisfied before triggering a message to run; optional stream.
8. VARSTOP: describes the variable conditions that must be satisfied before ending the message; optional stream.
9. VARUSED: lists variables used in a message file; optional stream.
10. DESTPARAMS: supplies destination parameters, such as recipient site location, required for transmitting the message to the destination; required stream.
11. TEMPLATE: identifes that the message was created with the user interface using a specific template; optional stream. For example, a template can define message destination, presentation style and message runtime.
12. RESPONSE IN: indicates that the recipient communication device should respond back to the message source after the message has been sent; optional stream. For example, this stream can request the recipient communication device to confirm receipt of the message. Alternatively, the communication device can provide other information, such as temperature data sensed by an attached temperature probe.

Based on the contents of the .msa file data streams, message server 14 routes the message to communication device interface 16. The .msa file format described above, although preferred, is offered by way of example only. Communications can be transmitted in other types of formats, or formats that include fewer, more or alternative data streams.

In addition to submitting text messages and commands embedded in the .msa file format to message server 14, automated source interface 22 provides an avenue for automated sources, such as real-time production databases, to provide variable data to update messages that are active in system 10. In the preferred embodiment, the variable data is submitted to message server 14 in regular intervals or whenever the data changes. Alternatively, variable data can be monitored and pending messages can be activated when the variable attains a specified value. Message server 14 routes the variable update data and any activated messages to communication device interface 16.

Upon receipt of a .msa file from message server 14 and based on the contents of the .msa file data streams, communication device interface 16 converts the message embedded in the .msa file to a format compatible with selected communication devices 18a–n. The converted message is then transmitted to the specified sites. Device interface 16 preferably includes a plurality of protocol converters 24a–n and a plurality of device drivers 26a–n. A plurality of protocol converters is used because each protocol converter 24a–n can convert the message to the format required for one type of communication device 18a–n. A plurality of device drivers 26a–n is required to interface system 10 to hardware needed to transmit the converted message to communication devices 18a–n.

Figure 5:
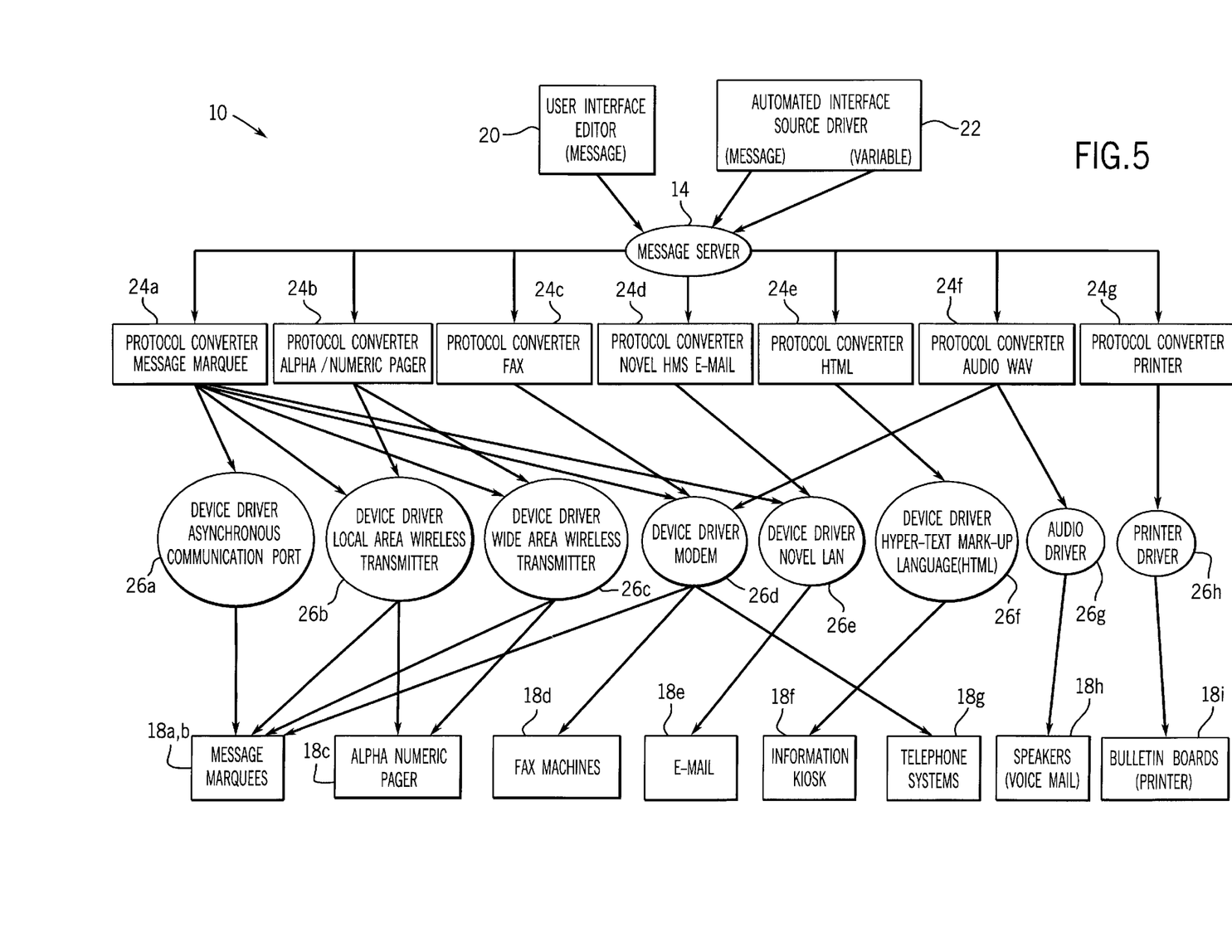
FIG. 5 is a system detail block diagram of an exemplary embodiment of the integrated message system of FIG. 1, illustrating various types of communication devices and associated communication device interfaces.

The function of communication device interface 16 may best be illustrated by referring ahead to FIG. 5 and by way of the following exemplary scenario. In this scenario, message server 14 receives a message file from user interface 20 including a message intended for a message marquee 18a hardwired to system 10, a message marquee 18b located at a remote site, and an alphanumeric pager 18c located at a remote site. Message server 14 routes the message file to protocol converter 24a, which converts the message to a format compatible with message marquees, and to protocol converter 24b, which converts the message to a format compatible with alphanumeric pagers. Protocol converter 24a then sends its converted message to device driver 26a, which provides an asynchronous port interface for communication with the hardwired message marquee 18a, and to device driver 26b, which provides a wireless transmitter interface for communication with the remote message marquee 18b. Protocol converter 24b also sends its converted message to device driver 26b for communication with remote alphanumeric pager 18c.

As illustrated in FIG. 5, system 10 preferably includes various other types of protocol converters 24a–n that convert messages to formats, such as are compatible with fax machines, e-mail systems, hyper-text language (HTML), audio devices (audio.wav) and printers. In addition, system 10 preferably includes a variety of other device drivers 26a–n which interface system 10 with, for example, local area and wide area personal computer networks, local area and wide area wireless networks, telephone networks and audio drivers. The various protocol converters 24a–n, device drivers 26a–n and communication devices 18a–n illustrated in FIG. 5 are offered by way of example only. Other types and configurations of converters, drivers and communication devices could also be adapted for use in system 10.

Figure 2:
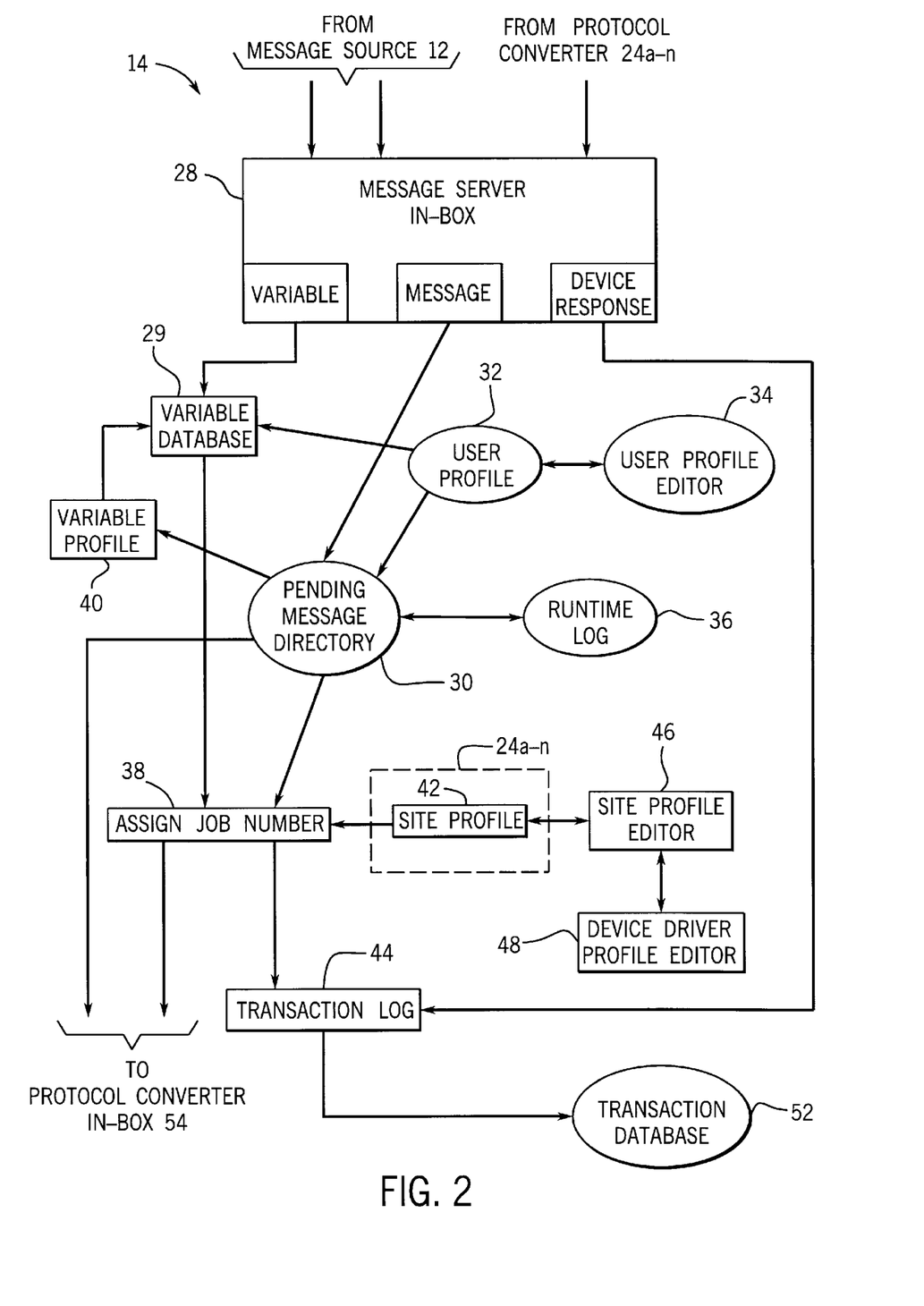
FIG. 2 is a flow chart illustrating data flow through an exemplary embodiment of the message server level of the system of FIG. 1.

Referring now to FIG. 2, data flow through message server 14 is illustrated. Message server 14 includes an in-box 28 providing the interface for receiving messages, commands and variable data from message source 12, as well as response messages from communication devices 18a–n. Message server 14 supports various interfaces, such as sub-directory in-box, Dynamic Data Exchange (DDE) or Transfer Control Protocol/Internet Protocol (TCP/IP) messaging. Thus, message files can be received from a variety of local or remote message sources and can be generated either by automated sources or users.

Variable data received in in-box 28 is sent to a variable database 29 which maintains a list of variable names and their corresponding parameters, such as value, update rate and destination. Messages received in in-box 28 are sent to a pending message directory 30 where held until activated. When messages are received directory 30 checks a user profile 32 to verify that the user or automated source that generated the message has been authorized to transmit to communication devices 18a–n specified by the message parameters. Users are required to register with a system administrator who assigns and edits the user rights contained in user profile 32 through a user profile editor 34. Similarly, variable database 29 checks with user profile 32 to verify the message source is authorized to send variables to specified communication devices 18a–n.

In the preferred embodiment, message server 14 also examines the message parameters to determine running time, and logs the information in a runtime log 36. Runtime log 36 then assumes responsibility for activating files pending in directory 30.

Once activated, pending message directory 30 passes the message file to an assign job number function 38. In addition, if the message file includes a variable, the message file also is submitted to a variable profile 40. Variable profile 40 maintains information about the variables, such as variable contents and variable running time intervals, including a list of communication devices 18a–n which are displaying a message containing the variable. Thus, when variable database 29 receives updated variable data from message server in-box 28, database 29 refers to the list stored in variable profile 40 to determine which communication devices 18a–n require the updated data. Based on the information, variable database 29 creates a message file in the .msa format and submits it to assign job number function 38. In alternative embodiments, variable data can be routed directly from variable database 29 to protocol converters 24a–n through a DDE interface.

As previously discussed, job number function 38 receives message files either from variable database 29 or pending message directory 30. Regardless the source, job number function 38 assigns a unique job number to the message file. When runtime log 36 activates a pending message file, job number function 38 informs the appropriate protocol converters 24a–n by submitting an activate command to the protocol converter in-box 54. The appropriate protocol converters 24a–n are selected based on the message parameters and information contained in a site profile 42 located in each protocol converter 24a–n. Protocol converter in-box 54 then retrieves the message from pending message directory 30 based on the information received from job number function 38. Finally, directory 38 logs the completed transaction in a transaction log 44.

A site profile editor 46 provides the vehicle for a system administrator to input and edit site information in site profile 42. A device driver editor 48 can be accessed through site profile editor 46 to input and modify information in a device driver profile 50. For example, site profile 42 includes information directing protocol converters 24a–n to appropriate device drivers 26a–n. Portions of this information can be derived through device driver editor 48.

Transaction log 44 maintains a record of all transactions performed by job number function 38. In addition, transaction log 44 stores device responses received through message server in-box 28. In-box 28 provides the interface for receiving responses requested from and transmitted by communication devices 18a–n and for receiving transmission status information from devices 18a–n. Alternatively, requested responses can by-pass message server 14 and be sent directly to the requesting message source. A transaction database 52, in communication with transaction log 44, stores the contents of log 44 in an Open Database Connectivity ("ODBC") compatible format. For example, Microsoft Access is an ODBC compatible format which allows the user to generate a transaction report.

In addition to routing messages to protocol converters 24a–n, message server 14 also transmits server commands, such as the activate message command discussed previously. Other server commands can include a delete message command and a delete all messages command.

Figure 3:
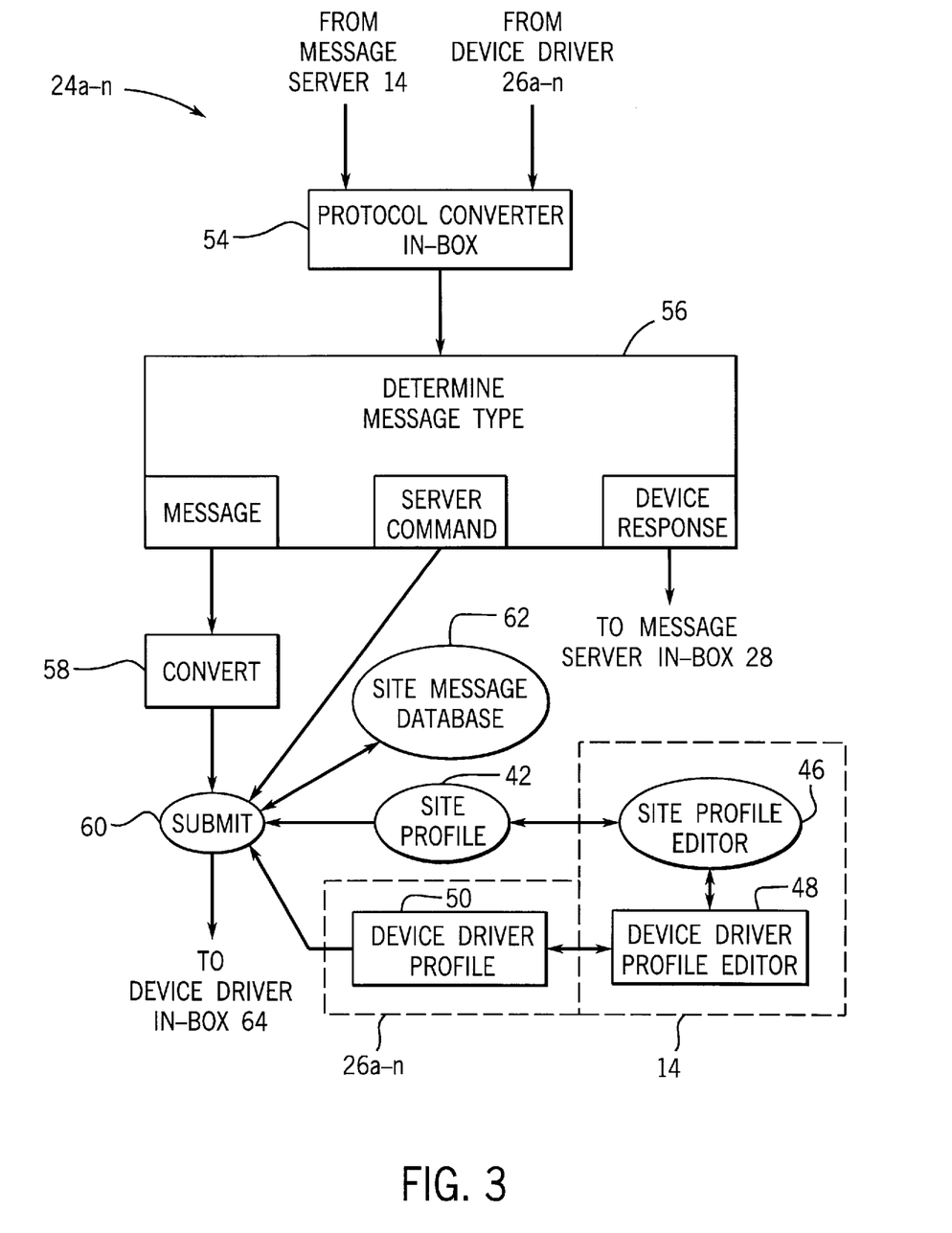
FIG. 3 is a flow chart of the data flow through an exemplary embodiment of a protocol converter which is included in the communication device interface level of the system of FIG. 1.

Referring now to FIG. 3, the data flow through an exemplary protocol converter 24a–n is illustrated in which protocol converter 24a–n receives messages and server commands from message server 14 and device responses from device drivers 26a–n. Each protocol converter 24a–n converts messages to a format associated with a particular type of communication device 18a–n. By way of example, protocol converter 24a converts messages to a format compatible with message marquees; protocol converter 24b converts messages to a format compatible with alphanumeric pagers. Protocol converters 24a–n then determine and submit the converted message to the appropriate device drivers 26a–n.

As illustrated in FIG. 3, a protocol converter in-box 54 provides the interface for receiving various types of communications. The communication then proceeds to a data block 56, in which protocol converter 24a–n determines the type of communication by analyzing the message parameters in the .msa file. If protocol converter 24a–n determines that the communication is a message, then the communication moves to a convert stage 58 in which the message is converted to the format compatible with the selected type of communication device 18a–n. The converted message then moves to a submit stage 60. If the communication is a server command, then the server command bypasses convert stage 58 and moves directly to submit stage 60.

In submit stage 60, protocol converter 24a–n consults site profile 42 to select the appropriate device driver 26a–n. In addition, protocol converter 24a–n looks to device driver profile 50 located in each of device drivers 26a–n to determine where to send the converted file. The converted file is then submitted to the selected device drivers 26a–n and the details of the transaction are logged in a site message database 62.

If data block 56 determines that the communication received in in-box 54 is a device response, then protocol converter 24a–n routes the response to message server in-box 28 which, in turn, logs the response in transaction log 44. Alternatively, the device response can be sent directly from protocol converter 24a–n to the requesting message source. In the preferred embodiment, device responses can include reports from device drivers 26a–n regarding the status of a transmitted message. If the report states that the transmission was successful, then the device response will be routed to message server in-box 28 as previously described. However, if a failure was detected, then protocol converter 24a–n re-submits the original message for a repeated attempt. The submit retry count either can be defined by a user or can be a default value.

Figure 4:
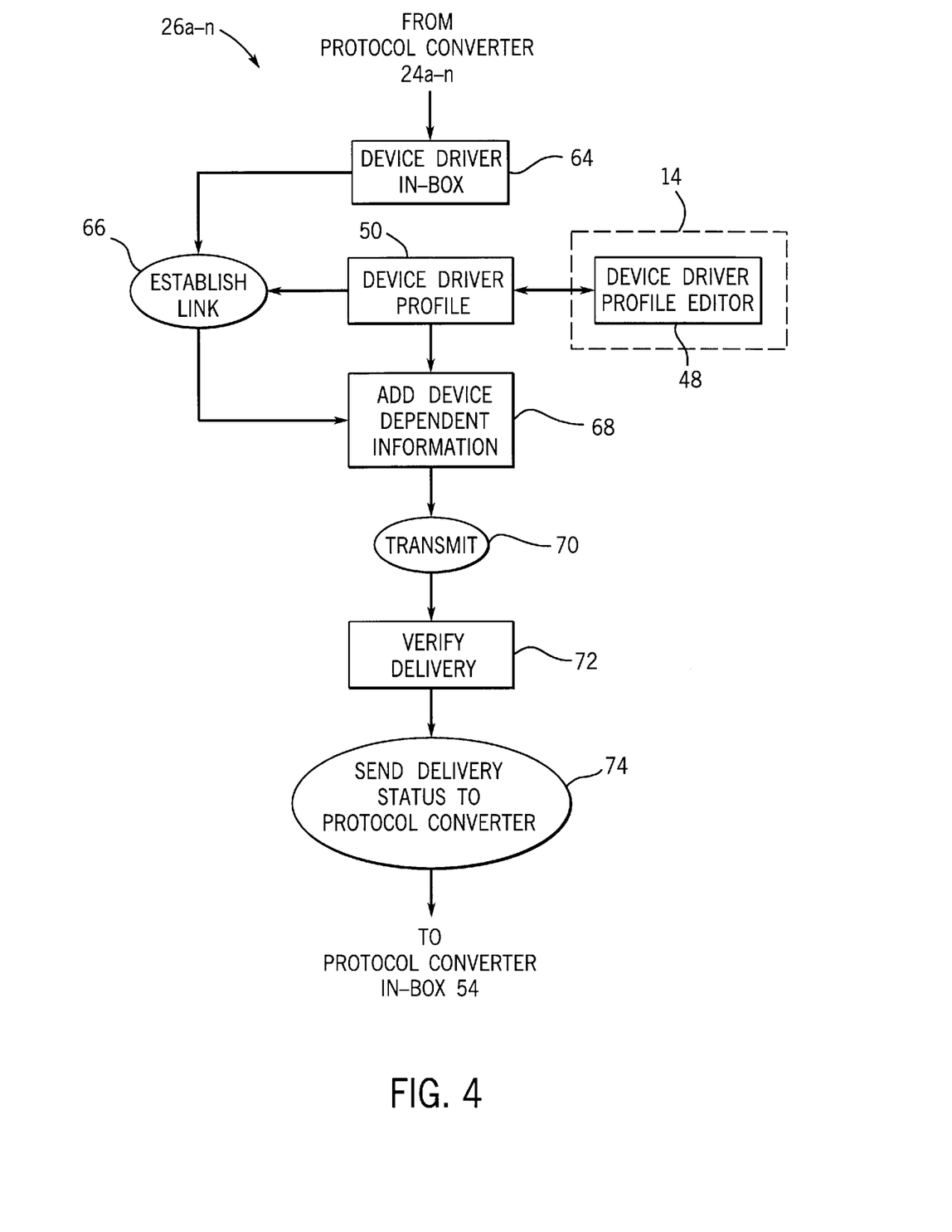
FIG. 4 is a flow chart depicting the data flow through an exemplary embodiment of a device driver, which also is included in the communication device interface level of the system of FIG. 1.

Referring now to FIG. 4, data flow through an exemplary device driver 26a–n is illustrated. First, a device driver in-box 64 receives the converted file from protocol converters 24a–n. Next, as shown in a data block 66, device driver 26a–n establishes a communication link to selected communication devices 18a–n by accessing device driver information, such as required data field lengths and initialization strings, contained in device driver profile 50. Based on the accessed information, and as illustrated in a data block 68, device driver 26a–n adds device dependent information to the message, such as headers or trailers. In a data block 70, the prepared communication is then transmitted to selected communication devices 18a–n, and the status of the transmission is verified in a data block 72. In a data block 74, the status information is delivered to protocol converter 24a–n through in-box 54. As described above, in the event the status indicates that the transmission failed, protocol converter 24a–n will submit the communication for another attempt.

Referring now to FIG. 5, an exemplary embodiment illustrates the versatility of system 10. The open architecture of system 10 supports diverse applications in which different types of messages generated by a variety of message sources are automatically converted to the appropriate format for transmission to a variety of communication devices. Among the multitude of possible applications, the communication devices can be used, for example, to display test messages, to produce audio or visual messages or to provide data back to the system.

While the embodiments illustrated in the figures and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. An integrated message system in communication with a message source which generates message data, message destination data and message update data, the system comprising:

a messaging interface configured to generate a message file based upon a message from the message source, the message file having a standardized format which includes message data representative of the message and destination data representative of a desired destination of the message data, the message data including variable data corresponding to an updatable portion of the message;

a message server coupled to the messaging interface to receive and store the message data and the destination data, and automatically dispatch the message data at a predetermined time, the message server being configured to receive message update data corresponding to the variable data, update the variable data to generate updated variable data, and automatically dispatch at least the updated variable data at a predetermined time; and a communication interface coupled to the message server to generate communication data representative of the message data and/or the updated variable data and to dispatch the communication data to the desired destination, wherein the communication data has a protocol dependent upon the destination data.

2. The system as recited in claim 1, wherein the predetermined time for automatically dispatching the message data occurs upon elapse of a time interval.

3. The system as recited in claim 1, wherein the predetermined time for automatically dispatching the updated variable data occurs upon elapse of a time interval.

4. The system as recited in claim 1, wherein the predetermined time for automatically dispatching the updated variable data occurs upon detection of a change in the message update data relative to the variable data.

5. The system as recited in claim 1, wherein the message source includes an automated message source and the automated message source generates the message update data.

6. The system as recited in claim 1, further comprising a message marquee located at the desired destination and configured to display indicia representative of the communication data.

7. The system as recited in claim 6, further comprising a communication device located at the desired destination, wherein the communication interface is further configured to generate second communication data which has a second protocol compatible with the communication device, and to transmit the second communication data to the desired destination, wherein the communication device provides sensible indicia representative of the second communication data.

8. The system as recited in claim 7, wherein the communication device is one of a pager, a printer, a personal computer, a facsimile machine and a speaker, or a combination thereof.

9. In an integrated message system, a method of automatically sending a message generated by a message source to a communication destination in a communication protocol compatible with the communication destination and automatically updating the message sent to the communication destination, the method comprising the steps of:

receiving a message from a message source;

generating and storing a message file based on the message, the message file including message data representative of the message and destination data representative of the communication destination of the message data, wherein the message data includes variable data corresponding to an updatable portion of the message;

selecting a communication destination based on the destination data;

generating communication data representative of the message data, wherein the communication data has a communication protocol dependent on the destination data;

automatically dispatching the communication data to the selected communication destination;

receiving message update data from the message source that corresponds to the variable data;

updating the variable data with the message update data;

generating updated communication data representative of the updated variable data, wherein the updated communication data has the communication protocol dependent on the destination data; and automatically dispatching the updated communication data to the selected communication destination.

10. The method as recited in claim 9, wherein the message file further includes a dispatch condition and automatically dispatching the communication data occurs when the dispatch condition occurs.

11. The method as recited in claim 9, wherein the message file further includes an update condition and automatically dispatching the updated communication data occurs when the update condition occurs.

12. The method as recited in claim 11, wherein the update condition is elapse of a time interval.

13. The method as recited in claim 11, wherein the update condition is detection of a change in the update data relative to the variable data in the stored message file.

14. The method as recited in claim 9, further comprising displaying indicia representative of the communication data and the updated communication data on a message marquee located at the selected communication destination.

15. The method as recited in claim 9, further comprising:

generating second communication data having a second communication protocol compatible with the selected communication destination;

automatically dispatching the second communication data to the selected communication destination;

generating second updated communication data having a second communication protocol compatible with the selected communication destination; and automatically dispatching the second updated communication data to the selected communication destination.

16. The method as recited in claim 15, further comprising:

displaying indicia representative of the communication data and the updated communication data on a message marquee located at the selected communication destination; and providing sensible indicia with a communication device located at the selected communication destination, the sensible indicia being representative of the second communication data and the second updated communication data.

17. The method as recited in claim 16, wherein the communication device is one of a pager, a printer, a personal computer, a facsimile machine and a speaker, or a combination thereof.

18. In an integrated message system which receives a message and update data associated with the message from a message source for dispatch to an addressed system subscriber, a message server comprising:

a user profile to store information representative of a plurality of system subscribers and at least one communication destination associated with each system subscriber;

a pending message directory to store a message file for dispatch to an addressed system subscriber of the plurality of system subscribers, the message file being based on a message received from a source and including destination data representative of the addressed system subscriber, a dispatch condition for dispatching the message data to the addressed system subscriber, and message data representative of the message, wherein the message data includes variable data corresponding to an updatable portion of the message; and a variable database to store update data received from the message source that corresponds to the variable data, wherein the message file further includes an update condition for updating the variable data with the update data;

wherein the message data is dispatched to the at least one communication destination associated with the addressed system subscriber when the dispatch condition occurs, and the variable data is updated with the update data when the update condition occurs, thereby generating updated variable data which is dispatched to the at least one communication destination associated with the addressed system subscriber.

19. The message server as recited in claim 18, wherein the dispatch condition is elapse of a time interval.

20. The message server as recited in claim 18, wherein the update condition is elapse of a time interval.

21. The message server as recited in claim 18, wherein the user profile further stores information identifying at least one communication device located at the at least one communication destination associated with each system subscriber.

22. The message server as recited in claim 21, wherein the at least one communication device is a message marquee.

* * * * *